United States Patent
Schaaf et al.

(10) Patent No.: US 11,445,368 B2
(45) Date of Patent: Sep. 13, 2022

(54) VEHICLE, NETWORK COMPONENT, METHOD, COMPUTER PROGRAM AND DEVICE FOR GENERATING AN ID FOR AN EQUIPPED STATUS OF A VEHICLE

(71) Applicant: Volkswagen Aktiengesellschaft, Wolfsburg (DE)

(72) Inventors: Klaus Schaaf, Braunschweig (DE); Janine Härtel, Hamburg (DE); Nicolai Bartkowiak, Giesen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 341 days.

(21) Appl. No.: 16/684,927

(22) Filed: Nov. 15, 2019

(65) Prior Publication Data
US 2020/0162912 A1    May 21, 2020

(30) Foreign Application Priority Data
Nov. 16, 2018   (DE) ...................... 10 2018 219 719.9

(51) Int. Cl.
*H04W 12/06* (2021.01)
*H04W 4/40* (2018.01)
(Continued)

(52) U.S. Cl.
CPC .............. *H04W 12/06* (2013.01); *G06F 8/71* (2013.01); *G06F 16/9024* (2019.01);
(Continued)

(58) Field of Classification Search
CPC ........... H04W 12/06; H04W 4/40; G06F 8/71; G06F 16/9024; G06F 21/64;
(Continued)

(56) References Cited

U.S. PATENT DOCUMENTS 10,666,767 B1 *    5/2020   Floyd ...................... H04L 67/10
11,263,232 B2 *    3/2022   Kaji ........................ G07C 5/008
(Continued)

FOREIGN PATENT DOCUMENTS

DE    102016007472 A1    12/2017    ............... G07C 5/08
DE    102017204538 A1    9/2018    ............. G06F 19/00
(Continued)

OTHER PUBLICATIONS

Wheal, Chris, "How Can Blockchain Benefit the Car Industry," In Openledger.IO, URL: https://dex.openledger.io/how-can-blockchain-benefit-the-car-industry/, 2 pages, Oct. 15, 2018.
(Continued)

*Primary Examiner* — Taghi T Arani
*Assistant Examiner* — Blake I Narramore
(74) *Attorney, Agent, or Firm* — Slayden Grubert Beard PLLC (57) ABSTRACT

Exemplary embodiments create a vehicle, a network component, a method, a computer program and a device for generating an ID for an equipped status of a vehicle. The method for generating an ID for an equipped status of a vehicle comprises determining a first information on one or more available software components and their software versions and determining a second information on one or more available hardware components and their hardware versions. The method moreover comprises generating a hash value based on the first information, the second information and software content of the one or more software components, and providing the hash value as an ID for the equipped status of the vehicle.

20 Claims, 5 Drawing Sheets

(51) Int. Cl.
*G06F 16/901* (2019.01)
*G06F 8/71* (2018.01)
*H04L 9/06* (2006.01)
*H04L 9/00* (2022.01)

(52) U.S. Cl.
CPC ............. *H04L 9/0643* (2013.01); *H04W 4/40* (2018.02); *H04L 9/50* (2022.05)

(58) Field of Classification Search
CPC .. G06F 16/211; H04L 9/0643; H04L 2209/38; H04L 9/3239; H04L 2209/84
See application file for complete search history.

(56) References Cited

U.S. PATENT DOCUMENTS

| | | | | |
|---|---|---|---|---|
| 2017/0034021 | A1* | 2/2017 | Petrucci | H04B 1/082 |
| 2018/0018723 | A1* | 1/2018 | Nagla | H04L 63/08 |
| 2018/0346016 | A1* | 12/2018 | Otto | B62D 5/0481 |
| 2019/0004784 | A1* | 1/2019 | Rocci | G06F 12/0875 |
| 2020/0041994 | A1* | 2/2020 | Alalao | G05D 1/0088 |
| 2020/0151971 | A1* | 5/2020 | Ogawa | G06Q 50/30 |
| 2021/0167988 | A1* | 6/2021 | Harata | H04L 67/12 |
| 2021/0272389 | A1* | 9/2021 | Prenger | H04L 12/40 |
| 2021/0342946 | A1* | 11/2021 | Leise | G06Q 20/4015 |
| 2021/0350469 | A1* | 11/2021 | Bryant | G06Q 20/389 |

FOREIGN PATENT DOCUMENTS

| | | | | |
|---|---|---|---|---|
| WO | 2018/014123 | A1 | 1/2018 | G06Q 10/00 |
| WO | 2018/053413 | A1 | 3/2018 | G08B 1/00 |

OTHER PUBLICATIONS

German Office Action, Application No. 102018219719.9, 8 pages, dated Jul. 2, 2019.

Stöcker, Carsten, "Implementing First Industry 4.0 Use Cases with DAG Tangle—Machine Tagging for Digital Twins," Medium, URL: https://medium.com/@cstoecker/implementing-first-industry-4-0-use-cases-with-iota-dag-tangle-machine-tagging-for-digital-twins-baf1943c499d, 7 pages, Jun. 24, 2017.

* cited by examiner

VEHICLE, NETWORK COMPONENT, METHOD, COMPUTER PROGRAM AND DEVICE FOR GENERATING AN ID FOR AN EQUIPPED STATUS OF A VEHICLE

CROSS-REFERENCE TO RELATED APPLICATIONS

This application claims priority to German Patent Application No. DE 10 2018 219 719.9, filed on Nov. 16, 2018 with the German Patent and Trademark Office. The contents of the aforesaid Patent Application are incorporated herein for all purposes.

TECHNICAL FIELD

The present invention relates to a vehicle, a network component, a method, a computer program and a device for generating an ID for an equipped status of a vehicle, and in particular but not exclusively to a concept for using distributed ledger technology (DLT, distributed ledger/transaction database) based on a one-dimensional or multidimensional acyclic graph (such as a block chain, directed acyclic graph (DAG)) for the secure and unique verifiability of software content, hardware versions and external parameters in vehicles.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Currently, vehicles supply and require a wide range of data that are evaluated or processed by internal ECUs (electronic control units), or respectively program data that are run on the ECUs.

It is foreseeable that pending changes in the automotive industry with respect to a strongly increasing dominance of software in vehicles will make it necessary to create a trustworthy environment for ensuring the verifiability of the vehicle software history and the vehicle status. Vehicle manufacturers (also termed original equipment manufacturers (OEMs)) must be able to provide reliable information to state officials such as a Department of Motor Vehicles (DMV) on the vehicle status (such as the software version and content) and a precise time (timestamp) in the event of an accident or a potential software modification. This is particularly relevant when partially autonomous or fully automated driving comes about in the future. Moreover, when expanding vehicle-related services such as functions on-demand (FoD), downloading functions and software over the air (OTA) and enabling software modules (the electronic control units in the vehicle), it must be documented when the software was provided (timestamp), how long it was used (timeframe), and who supplied it (supplier), possibly also for user fees.

Currently, data are only backed up centrally in databases at the OEMs. Restricted systems exist for backing up data volumes in decentralized systems. According to the current state-of-the-art, the relevant data are saved on centralized databases in software updates. This data can be easily manipulated, or respectively modified. DLT is a suitable method for nonmodifiable storage. Within a DLT, a data structure is used that ensures non-modifiability by linking data using hash algorithms. Such concepts have already been described in the documents WO 2018/014123 A1, WO2018/053413 A1 and DE 10 2016 007 472 A1.

This offers a reliable basis for third-party testing and for creating a reliable environment (such as agencies, inspection associations, insurance companies, etc.). Current implementations such as (public) block chains have low transaction speeds and are frequently associated with high transaction costs as well as high energy costs. Consequently, they are only conditionally suitable for the number of relevant transactions for software updates via OTA. Moreover, micropayments for machine-to-machine (M2M) payments with the assistance of private block chains are not feasible given the current state-of-the-art. This generally does not affect permissioned or public block chains, but it is associated with a high degree of uncertainty. Moreover, the amount of data is increasing with the growing number of vehicles and transactions and therefore overloads all of the members participating in the network.

Previously in a software update process, only metadata such as the vehicle configuration, software version and hardware version are hashed and verified through the vehicle using the vehicle backend. A backend can for example be a computer/server provided by the manufacturer that has corresponding data, or generally databases that can be reached through a network access. In doing so, however, information on the software content and firmware is not hashed, or respectively saved. Accordingly, altered software or incorrect software content might be transmitted. This software version would nonetheless have the same software name and version number and could not be discovered as software that had been altered.

SUMMARY

Therefore there is a need to create an improved approach for monitoring an equipped status.

A vehicle, a network component, a method, a computer program and a device according to the appended independent claims meet this need. Embodiments and developments are the subject matter of the dependent claims and the following description.

Exemplary embodiments are based on the insight that secure and unique verifiability of software content can also be taken into account by a hashing algorithm. Moreover, beyond hashing software content and versions (firmware) as well as external parameters with software updates that are transmitted via over the air technology (OTA, i.e., wirelessly) to vehicles, a DLT based on a one-dimensional or multidimensional DAG structure can be used that also takes into account the software content. Accordingly, a checking mechanism for the equipped statuses of vehicles can be created that also permits third parties to check in a reliable manner.

The details of one or more embodiments are set forth in the description below. Other features will be apparent from the description, drawings, and from the claims.

DESCRIPTION

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

Exemplary embodiments establish a method for generating an ID for an equipped status of a vehicle. The method comprises determining a first information on one or more available software components and their software versions and determining a second information on one or more available hardware components and their hardware versions. The method also comprises generating a hash value based on the first information, the second information and software content of the one or more software components, and providing the hash value as an ID for the equipped status (with regard to hardware and software) of the vehicle. Exemplary embodiments may also render changes in the software content discernible by taking into account the software content when determining the hash value. The equipped status of the vehicle may accordingly also be verified using the concrete software content of a specific software version. By additionally using the hardware information, for example IDs of the electronic control units, the hardware may also be verified, and an exchange of the hardware but with the same software may also be recognized.

In some exemplary embodiments, the method may furthermore comprise saving the hash value in a decentralized database. Such exemplary embodiments may accordingly establish a higher degree of security and reliability in the verification of software and hardware of a vehicle. In other exemplary embodiments, the decentralized database may be combined with a DLT, in particular a block chain or an application that follows a multidimensionally directed graph (such as a Tangle). For example, DLT can be used in this case so that several network components can participate in hashing and saving the hash value and therefore prevent individual, or a group of individual, network components from secretly being able to manipulate software content. In doing so, a plurality of information that are available as hash may be combined so that the individual components nonetheless remain distinguishable.

In some exemplary embodiments, saving may be performed in a multidimensional graph. Such exemplary embodiments are based on the core concept that, in addition to sequential block chains, DAG-based structures exist that can render the network faster and more secure as the number of transactions increases since transactions can be processed simultaneously. In such exemplary embodiments, the approach provides that the sender first always verifies several previous transactions that represent the basis for the scalability of the structure. This structure may also be used without a network link with the DLT in some embodiments; consequently, the software update process may be performed off-line and verifiably as well.

In some exemplary embodiments, generating the hash value may furthermore be based on one or more elements of the group consisting of a vehicle configuration, a point in time of generation, a vehicle parameter, a maximum speed, an activation of an adaptive distance alert, and an activation of a vehicle-related service. Exemplary embodiments may accordingly permit the incorporation of other parameters that are then also verifiable. In doing so, external parameters may for example be incorporated, hashed and saved as well as compared with the backend of the vehicle.

The saving may be unique in some exemplary embodiments, and changes in the saved data may be detectable by verifying the hash value. It is therefore possible to generate a hash value using actually available vehicle data, and to compare said hash value with a (secure/reliable) hash value saved in a distributed manner in some embodiments.

The saving may in some embodiments include distributing identical copies of the ID to a network with several members. Accordingly, distributed saving can be achieved, at least in several exemplary embodiments.

The method may include the verification of an equipped status of the vehicle by verifying the generated ID with an ID provided by the vehicle, for example also in conjunction with a vehicle identification number (VIN). In doing so, third parties can be enabled to reliably check the equipped status (at least the software version, hardware version and software content). For example, the verification of the equipped status may be performed each time the vehicle starts in some embodiments.

Another exemplary embodiment is a computer program for executing one or more of the embodiments of the methods described herein, when the computer program runs on a computer, a processor, or a programmable hardware component. Another exemplary embodiment is a device with a control module that is designed to execute one or more of the embodiments of the methods described herein. Exemplary embodiments moreover establish a vehicle and a network component that includes a corresponding device as discussed, as well as a system with a vehicle and a network component according to the present description, for example configured to operate one or more of the embodiments of the method discussed herein.

Various exemplary embodiments will now be described in greater detail with reference to the accompanying drawings in which a few exemplary embodiments are shown. Optional features or components are shown with dashed lines.

Although exemplary embodiments can be modified and changed in different ways, exemplary embodiments are shown as examples in the figures and will be described in detail in this context. It should, however, also be noted that it is not intended to restrict exemplary embodiments to the disclosed forms; rather, the exemplary embodiments are to cover all functional and/or structural modifications, equivalents and alternatives that lie within the scope of the invention.

It should be considered that an element that is designated as being "connected" or "coupled" to another element may be directly connected or coupled to the other element, or there may also be intermediate elements. However, if an element is designated as being "directly connected" or "directly coupled" to another element, there are no intermediate elements. Other terms that are used to describe the relationship between elements should be interpreted in a similar manner (for example "between" in comparison to "directly between", "adjacent" in comparison to "directly adjacent", etc.).

The terminology that is used herein only serves to describe certain exemplary embodiments and should not restrict the exemplary embodiments. As used herein, the singular forms "a" "of a" and "the" should also include the plural form as long as the context does not clearly indicate otherwise. It is further noted that the expressions such as "contains", "containing", "has, "includes", "comprising" and/or "having" as used herein indicate the presence of the mentioned features, whole numbers, steps, work processes, elements and/or components, but do not exclude the presence or addition of one, or respectively one or more features, whole numbers, steps, work processes, elements, components and/or groups.

Saving software update data exclusively on centralized databases generally allows the data to be modified by the controlling instance. Moreover, when saving software updates while transmitting only (hashed) metadata, for example the software version, only limited security is achievable since the changes in the software content are not reflected in the hash value. Accordingly, it cannot be clearly discerned if the software content is legal.

Figure 1:
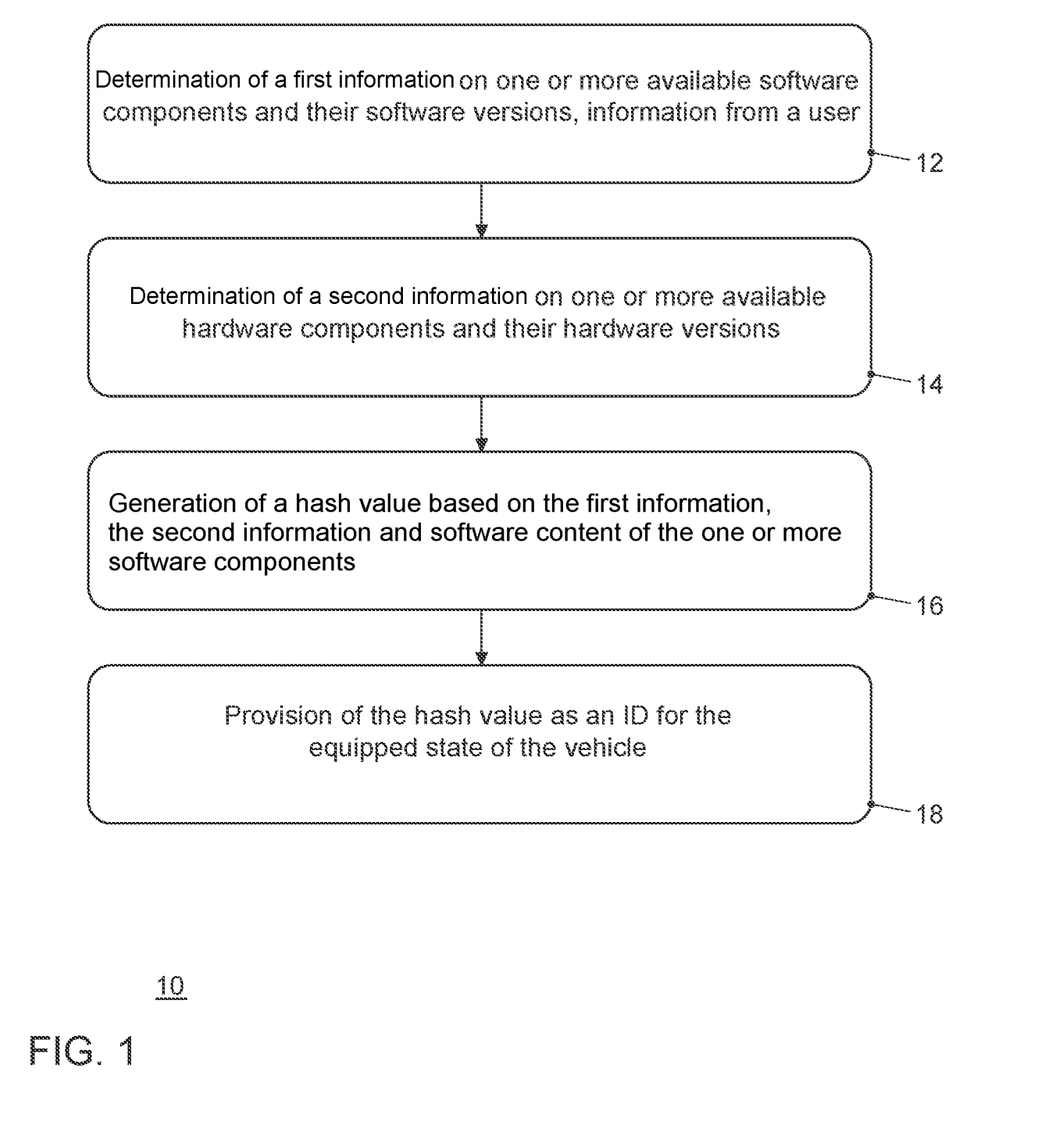
FIG. 1 shows a flowchart of an exemplary embodiment of a method for generating an ID for an equipped status of a vehicle.

FIG. 1 shows a flowchart of an exemplary embodiment of a method 10 for generating an ID for an equipped status of a vehicle. The method 10 comprises determining 12 a first information on one or more available software components and their software versions and determining 14 a second information on one or more available hardware components and their hardware versions. The method 10 also comprises generating 16 a hash value based on the first information, the second information and software content of the one or more software components, and providing 18 the hash value as an ID for the equipped status of the vehicle.

Every conceivable vehicle (road vehicle, watercraft or aircraft including drones, etc.) that uses software can serve as the vehicles. Examples are passenger cars, commercial vehicles, two-wheeled vehicles, trains, airplanes, ships, etc. In addition to means of transportation, drones are also possible, in particular those that are used industrially (goods delivery), as well as all mobile devices in general where there is an interest in monitoring the equipped status.

When generating the hash value, a hash function (distribution coefficient function) can be accessed in this case that maps a first larger amount of data on a second smaller amount data. As the name indicates, output values are formed from the input values by dispersing or chopping up output values. In this case, changes in the input values should also lead to changes in the output values if at all possible. The hash function provides such a hashing algorithm, wherein this is already available with different properties. The hash value that represents the output of the hashing algorithm therefore forms a type of signature, test number or fingerprint of the input data in order to render its authenticity verifiable. A unique feature of hashing technology is that different inputs do not yield identical hash. Back-calculating from the hash value to the content (with a reasonable amount of effort) can also be excluded. In general, various hashing functions are conceivable in exemplary embodiments.

The input values used in the exemplary embodiments (information on software versions and hardware versions as well as hardware content) can be the actual original information (source data), or portions of data selected according to a specific key or algorithm. Exemplary embodiments accordingly establish verifiability of the software content as well since modified content yields modified IDs or hash values.

Exemplary embodiments also establish a device with a control module that is designed to perform one of the methods described herein. For example, such a method can be implemented in software and can then be executed by corresponding hardware. In exemplary embodiments, such a control module can for example correspond to one or more discretionary controllers or processors, or a programmable hardware component. For example, a device can also be realized as software that is programmed for a corresponding hardware component. A control module can therefore be implemented as programmable hardware with correspondingly adapted software. In this context, any processors such as digital signal processors (DSPs) can be used. Exemplary embodiments are not restricted to a specific type of processor in this context. Any number of processors or also a plurality of processors or microcontrollers are conceivable for implementing the device or control module. Implementations in an integrated form with other control units are also conceivable, for example in a control unit for a vehicle, an ECU, a user terminal and a server that can also comprise one or more other functions.

Figure 2:
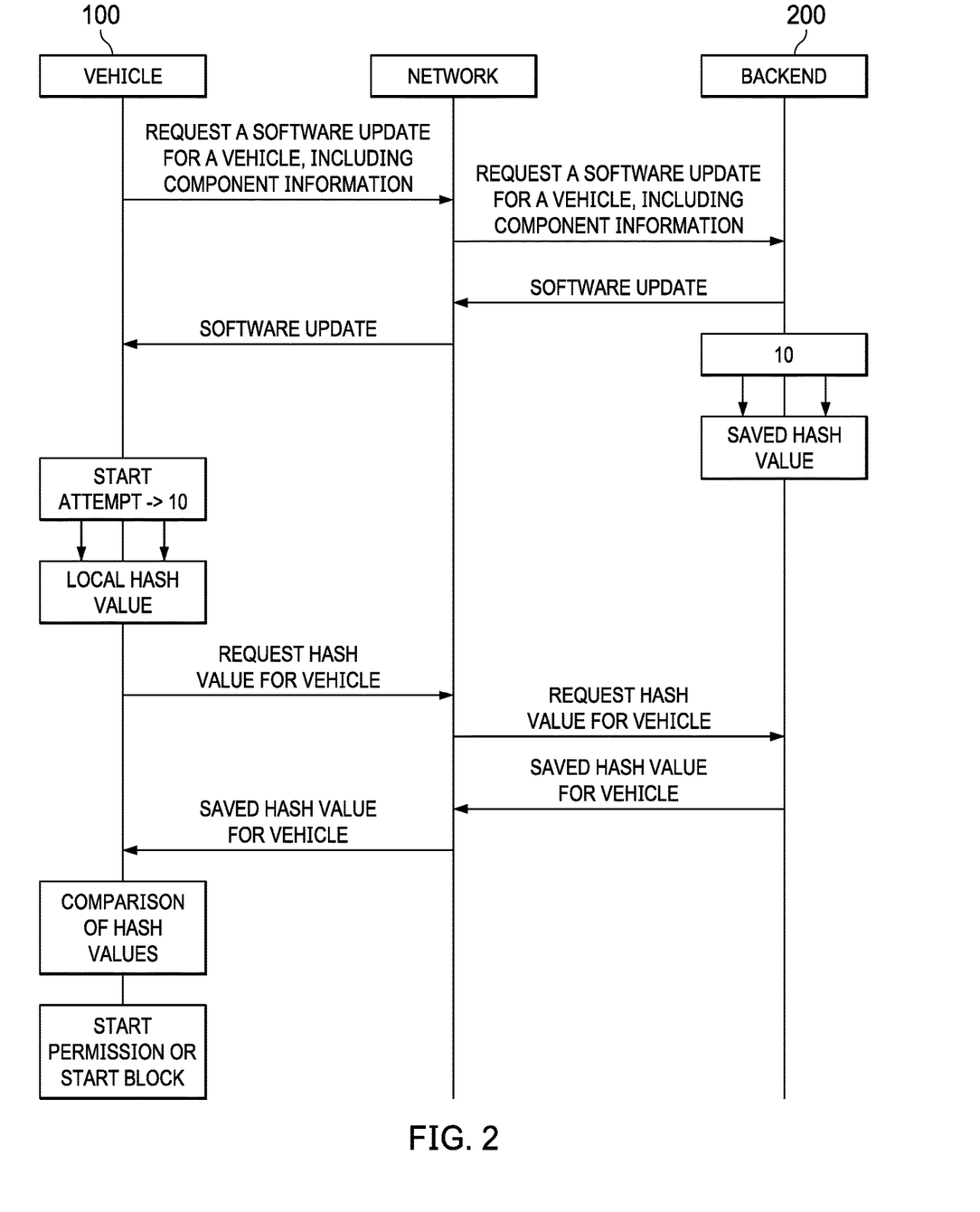
FIG. 2 shows a flowchart of a verification method in an exemplary embodiment.

Correspondingly, vehicles and network components with such devices form additional exemplary embodiments. FIG. 2 shows a flowchart of a method using a message sequence in an exemplary embodiment. On the left side, FIG. 2 shows an exemplary embodiment of a vehicle 100 with such a device that is coupled to a backend via the Internet. This backend comprises exemplary embodiments of network components 200 that also comprise such devices. In this respect, FIG. 2 also shows an exemplary embodiment of a system with one or more vehicles and one or more network components 200.

In this regard, FIG. 2 first illustrates a software updating process in the vehicle 100. In this regard, the vehicle 100 requests a software update from the backend 200 via a network. Alternatively, an update may also be offered by the backend 200 so that the initiative would be originate from at least one network component 200. The network can be any network such as the Internet. The connection of the vehicle 100 to this network may be made via corresponding communication interfaces (such as an OCU (online communication unit)); examples are a modem for a cellular radio network or WLAN (wireless local area network), etc.

In the example shown in FIG. 2, the request from the network component 200 is answered with a corresponding software update. The network component may perform the method described in FIG. 1 and save a hash value. The information about the hardware and the hardware versions from the vehicle 100 that is required for this are transmitted in this case in the context of the component information in the request. The backend is used in this case for saving. As will be explained in greater detail below, this may be accomplished in a distributed and protected manner, for example in a one-dimensional or multi-dimensional DLT, in particular with a block chain or an application that follows a multidimensionally directed graph.

FIG. 2 moreover shows a verification of an equipped status of the vehicle 100 by verifying the ID generated by the network component 200 (hash value) with an ID provided by the vehicle 100. In this case, the method 10 is executed locally in the vehicle 100, for example in the event of each start attempt, and a hash value/ID is calculated. In principle, this value can now be compared with the saved hash value from the backend to verify the equipped status of the vehicle 100. In this case, for example the corresponding hash value can be searched in a block chain or in a multi-dimensionally directed graph. The verification of the equipped status may for example be performed each time the vehicle starts. Two options are conceivable, i.e., performing the comparison in the vehicle or by the network. FIG. 2 shows the comparison on the part of the vehicle. In this case, the vehicle asks for the saved hash value from the backend during a start attempt and receives it from the backend. Provided that the two hash values correspond, the permission to start can be granted. If the values do not correspond, various measures are conceivable. In this case, FIG. 2 shows a start block; other options are a warning or error message (wrong software/hardware), a request for a software update, permitting a certain number of starts until the start block if the verification is unsuccessful, etc. Alternatively, the comparison may also be performed on the part of the network. To accomplish this, the vehicle 100 transfers the the locally generated hash value to a controlling network component 200 that performs the comparison and pursues corresponding measures depending on the result. In the event of network malfunctions, lack of coverage or other communication problems, a number of starts without verification can be permitted, for example.

Figure 3:
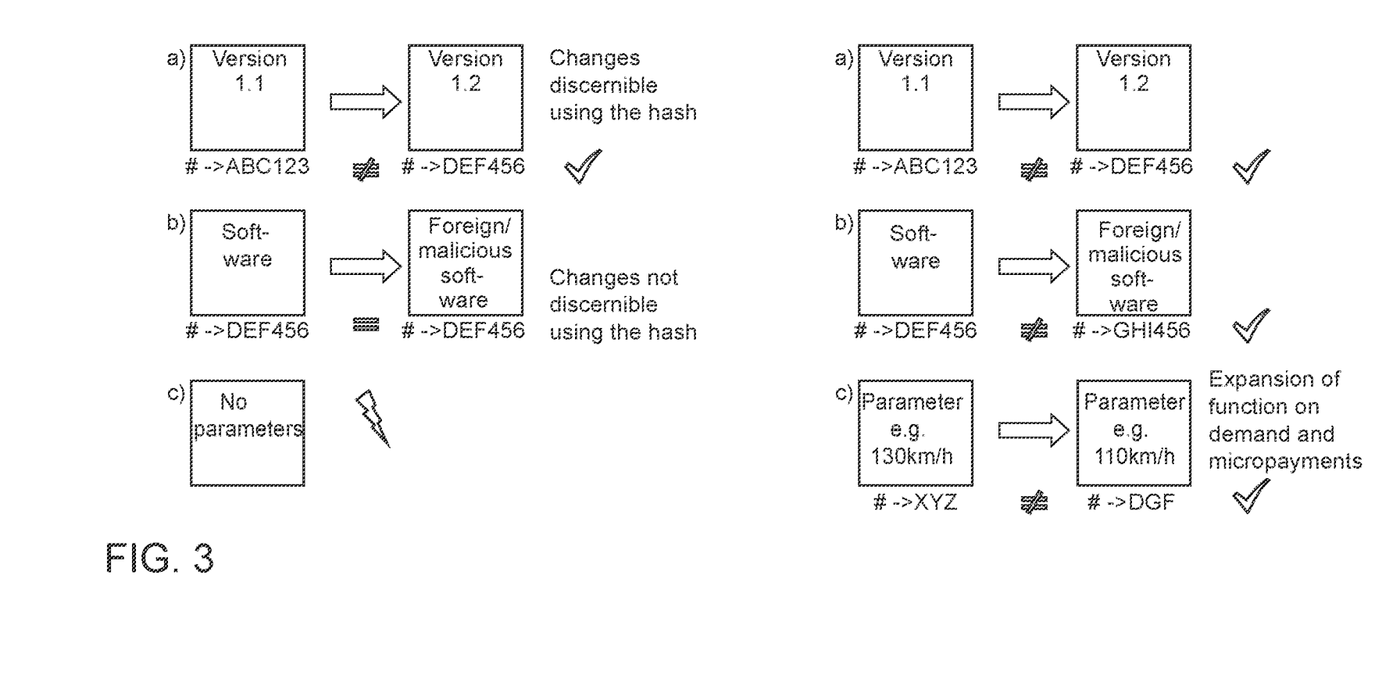
FIG. 3 shows an overview of the changes of hashing properties in exemplary embodiments.

FIG. 3 shows an overview of the changes of hashing properties in exemplary embodiments. On the left in FIG. 3, the conventional properties are shown, and on the right, the options in exemplary embodiments are shown. In this case, a vehicle scenario is assumed, wherein the vehicle has an online connectivity unit (OCU, a radio modem for connecting to a network such as cellular radio, Internet, etc.). In the first line, an example a) is shown in which software (such as configuration data in XML, extended markup language) with different version numbers is even now generating different hash values, and the version numbers are therefore verifiable. In the second line in example b), it becomes evident that altered software content with the same version number conventionally also leads to the same hash value. Consequently, changes to the software content are conventionally not discernible by using the hash. In exemplary embodiments, this is changed by taking into account the software content when generating the hash value, and FIG. 3b) shows on the right where altered software content (or altered firmware content) generates different hash values. Finally, FIG. 3 shows on the bottom that conventionally, no parameters are incorporated in generating the hash value that, however, may be taken into consideration by exemplary embodiments. This is shown on the bottom right in FIG. 3 where for example a set maximum speed of 130 km/h is included in the hash value and is thereby verifiable. A change in the maximum set speed therefore also leads to a changed hash value. Exemplary embodiments may moreover comprise an expansion to different services; examples are function on-demand (expansion of the function upon request) and micropayments (payment such as small payments between machines).

Exemplary embodiments may moreover carry out saving the hash value in a decentralized database. The term "decentralized database" means that, in contrast to centralized saving under the control of an individual network component, saving is decentralized under the control of a plurality of network components and to a plurality of network components. This increases the safety of the data (redundancy) and can also be used, as will be explained in greater detail below, to increase reliability and protection against manipulation. The decentralized database may for example correspond to a database according to a DLT, in particular a block chain or an application following a multidimensionally directed graph. This way, a network is used with a plurality of network components or computers that agree upon a sequence of transactions and update data using these transactions. These data are then saved in a distributed manner on the participating network components. Since the components agree beforehand about the transactions and the thereby manipulated data, later manipulations that are made to the data or transactions are recognized.

As an additional measure, saving may be performed in a multidimensional graph in other exemplary embodiments. In some exemplary embodiments, the computer or network components form a graph that can be directed. Accordingly, connections are formed between the individual network components that can in principle be directed or undirected. In this case, it can be a sequence, i.e., each leader has precisely one follower along the graph and its directed edges (connections). This would for example be the case in a block chain (sequence of blocks); the term "dimension" is used in this regard. This way, the chain of blocks can be saved on a plurality of network components so that the hash value is also correspondingly distributed/copied to the plurality of components. In doing so, this is not only saved, but it is also verifiable/traceable since the chain required for verification is also a available in a distributed manner. Manipulations to the chain or the data can accordingly be recognized by the changed hash value that results therefrom. Accordingly, the saving can include distributing identical copies of the ID to a network with several members. In a multidimensional case, parallel structures are formed so that, from the perspective of a participating network component, neighbors also exist in addition to leaders and followers with which agreements about transactions can also be reached, or respectively their transactions can also be checked. In this structure which is also parallel, corresponding parallel processes can occur that increase the processing speed and computing capacity.

With reference to FIG. 2, the vehicle may for example obtain the information from the backend upon a vehicle start that a new software update is available (at terminal 15). This information is provided by the connectivity (network in FIG. 2) between the vehicle 100 and backend 200. Exemplary embodiments include additional information beyond the information about the software versions, hardware versions, vehicle configuration and the time of hashing and comparison. In addition to this metadata, exemplary embodiments also provide hashing (encoding) all the software content to ensure that the correct software is also transmitted to the vehicles. This ensures that the vehicle status (equipped status at least with regard to hardware and software) is precisely described and also verifiably documented.

The status of the software update process, the vehicle status (software content, software version, hardware version) and the configuration are for example saved in the DLT 200 and accordingly cannot be manipulated or modified.

The DLT method enables the saving of the data on the multidimensional generated graph to no longer be subsequently modifiable, and a historical vehicle archive is archived. In other words, there are one or more digital twins. In a certain sense, the structure represents an open database in which all the transactions of the network are saved. Moreover, the amount of data are archived on the DLT in a hashed form in order to be verifiable by a checking party without having to disclose the data in text. The validation of the transactions (software update process) can occur in parallel so that a high transaction throughput is generated which, however, is not associated with any transaction costs.

In another exemplary embodiment, the method moreover comprises generating the hash value based on one or more elements of the group consisting of a vehicle configuration, a point in time of generation, a vehicle parameter, a maximum speed, an activation of an adaptive distance alert, and an activation of a vehicle-related service. In other words, at least several exemplary embodiments may include other information in the group of consistently verifiable and securely saved data. In particular, such information are of interest in this case that are associated with the authorizations of the vehicle user/operator, for example whether they are entitled to use certain functions (the equipment variants of the vehicle) or to operate the vehicle in certain modes (such as restricting the maximum speed). Exemplary embodiments may also provide incorporating and hashing external parameter data. In the case of software updates or function on-demand (FoD), additional data records are used such as the verification of speed. Accordingly, for example, beginning drivers could be designated with a limited maximum speed. Another example is the enabling of the ACC (adaptive cruise control) function and functions associated with vehicle-related services.

The exemplary embodiments enable additional functions beyond merely administering access to a central database in order to maintain the integrity of data. At least some exemplary embodiments may create applications for DLT in this area for saving software updates on a decentralized system. The use of a DLT method with a multidimensional developing graph for the nonmodifiable and secure saving of the entire software content and version in a hashed form including other meta-information of any vehicle at any point in time (timestamp) can enable improved verifiability of the vehicle software on the part of third parties as well. The saving may be unique in exemplary embodiments, and changes in the saved data may be detectable by verifying the hash value.

Exemplary embodiments are suitable as enabler technology for secure verifiability of a vehicle status and the software parameters used.

According to exemplary embodiments, a solution may exist in the unique and nonmodifiable saving of data (software content, external parameters and software versions) and metadata in a DLT with a multidimensionally directed graph. The data are saved in the DLT and publicly auditable since each member of the network has an identical copy.

In comparison to other technologies, a linear chain is not used in the conventional sense of a block chain in many exemplary embodiments since such a system would be too slow and energy-intensive and would access extensive computing power (mining, etc.). With this multidimensional approach, an increasing number of transactions are processed and authenticated simultaneously (checked more or less in real-time) which lends the structure the multidimensionality.

Figure 4:
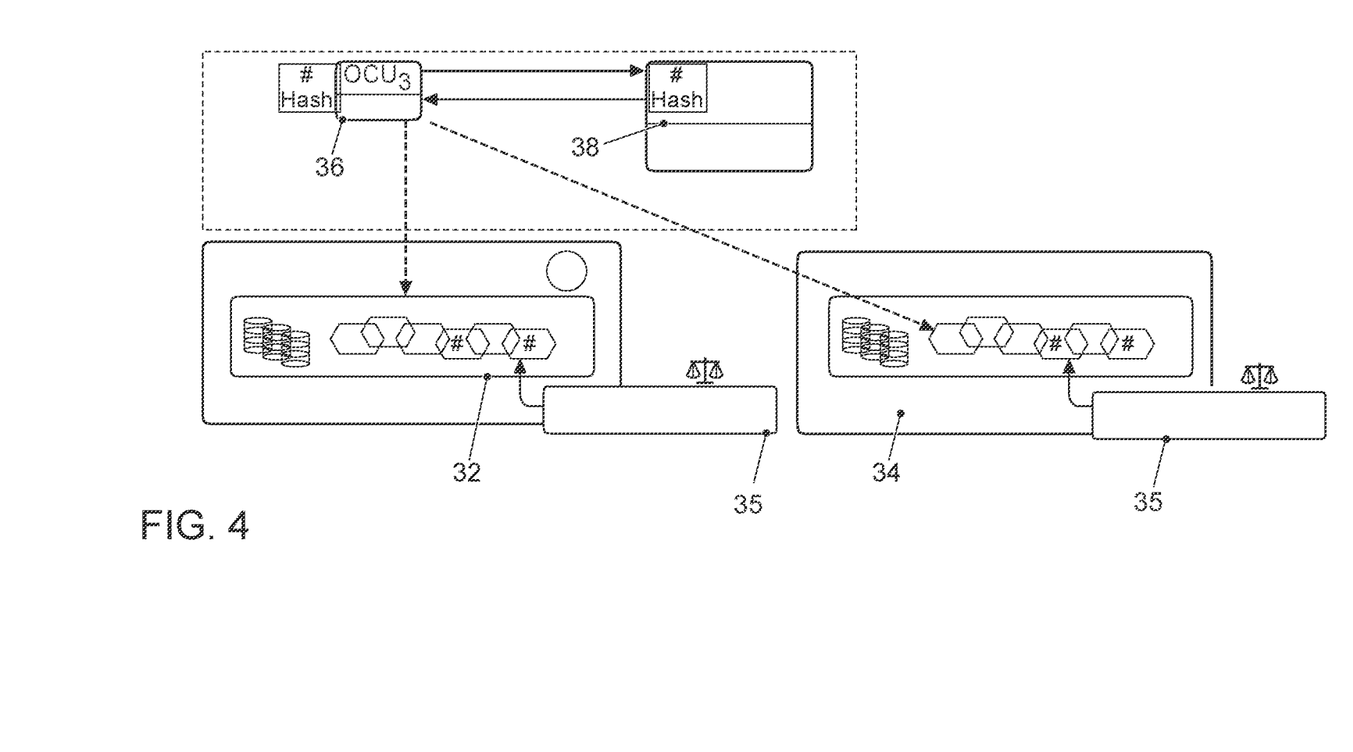
FIG. 4 shows an implementation of an exemplary embodiment of a method for generating an ID for an equipped status of a vehicle.

FIG. 4 illustrates an implementation of an exemplary embodiment of a method 10 for generating an ID for an equipped status of a vehicle. Two network versions are assumed. A first network version is identified by 32 that functions as a security system (for example as a cryptonumber system) and is implemented by a multidimensional directed graph (such as Tangle). This is a reliable and trustworthy data source (also "trusted source of data"). A second network version is identified as 34 and uses a block chain. This network version 34 as well is a reliable and trustworthy data source. For example, an authority 35 has access to both network versions and can check the respective transactions in both versions. The OCU 36 in the vehicle (can also be termed the client) has a software code (such as for Tangle) to communicate with the first network version 32 and a corresponding software code (such as block chain) for communicating with a second network version 34. Corresponding software/parameter updates are exchanged with a backend by the vehicle manufacturer 38. Such a backend can be designed as a modular backend building block (MBB). The link (also "connectivity") between the vehicle/OCU 36 and the backend 38 can be established by correspondingly designed interfaces in the vehicle 36 and in the backend 38. Overall, this accordingly yields a trustworthy network environment (trusted environment). In the considered exemplary embodiment, all software content is hashed. A hash value generated in the vehicle is combined with a hash value generated by the backend, and the result is saved in the first network version 32 as well as in the second network version 34.

Some approaches primarily use a block chain for safeguarding. Due to the noted disadvantages, this technology is only conditionally suitable for the application. Consequently, the DLT is accessed with DAG in some exemplary embodiments. Another use of the technology is incorporating machine to machine (M2M) payments. This can reliably document when the vehicle has run a vehicle application such as security systems such as multidimensional directed graphs, cryptopayment systems or IOTA.

Figure 5:
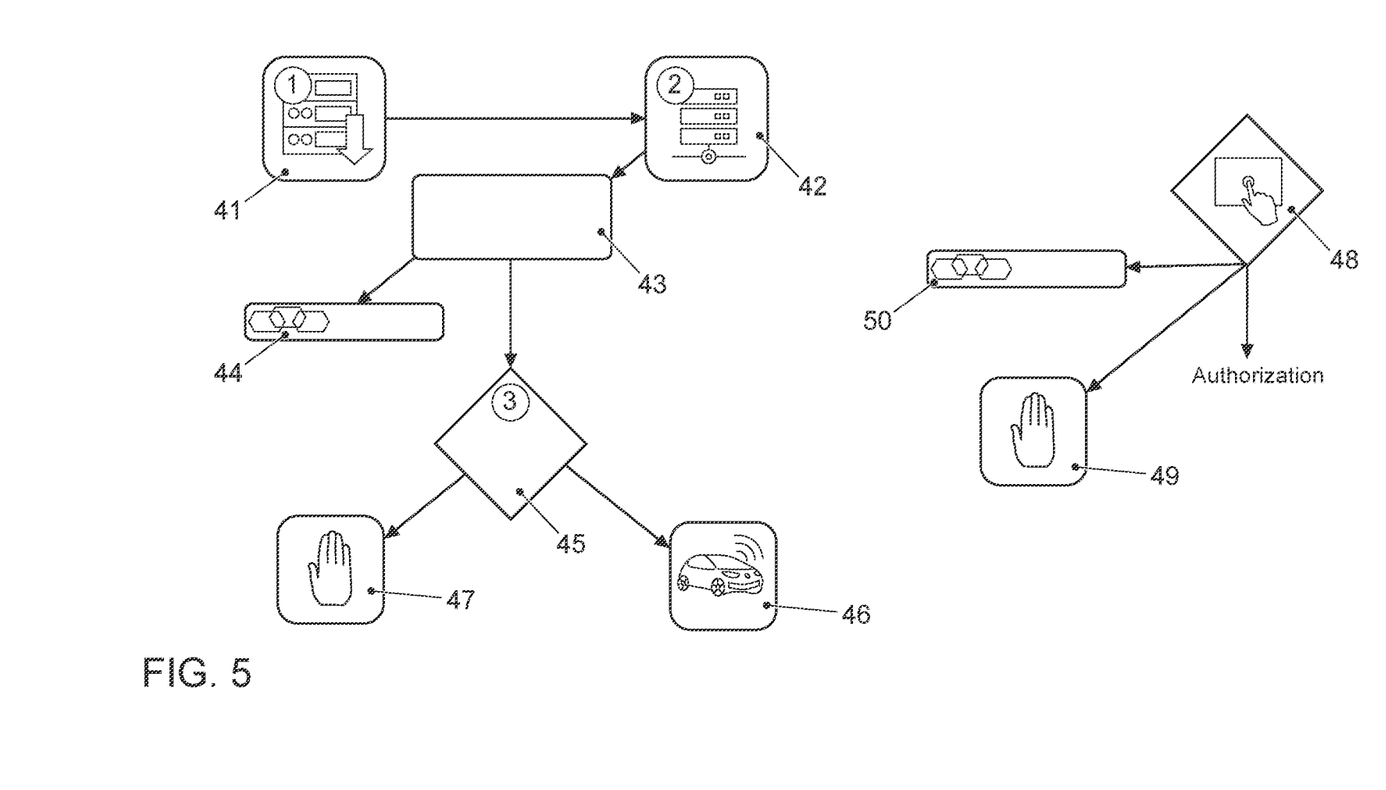
FIG. 5 shows various documentation scenarios in exemplary embodiments.

FIG. 5 illustrates various documentation scenarios for vehicle configurations in exemplary embodiments. In this exemplary embodiment, scenarios of the documentation in both network versions 32, 34 from FIG. 4 are assumed. Firstly on the left, FIG. 5 shows the vehicle side/vehicle configuration with an OCU 41 that sends an update job to a backend 42 (such as the manufacturer's server) and thereby requests an update. The backend 42 offers updates; in the present exemplary embodiment, this is always the case even if no current update exists (at least the last update is provided). The backend may accordingly provide an update if applicable. In the case of an update, the call 43 of the network versions (such as the block chain or respectively the Tangle) then follows via the corresponding code by the OCU 41, and the request of the update is documented 44. If a more recent update is available 45 (such as an online remote update), the downloading process 46 in the vehicle starts. If there is no more recent update 45, the update process is terminated 47. Moreover, on the left side, FIG. 5 shows the process from the perspective of the user (such as the vehicle driver) in the event of an update rejected by the backend. The user can for example start an update query 48 via an interface (human-machine interface (HMI) such as a touch-sensitive display or corresponding control elements) and must be authorized, perhaps with an ID (S-PIN, secure personal identification number). If there is no more current update, the process is terminated 49. Otherwise, the data is archived as a hash in at least one of the network versions (such as in the block chain or the Tangle) 50. Likewise, the update query can document itself independent of whether or not an update was actually performed. For example, update rejections may be documented in this manner by the vehicle user.

Special developments for the IoT (Internet of things), application/uses for transactions via OTA, or also transactions of vehicle-to-vehicle communication may be used in exemplary embodiments. Other areas of application by exemplary embodiments are all OTA applications, FoD, downloading functions, remote repair and remote production. In at least some exemplary embodiments, transactions are saved multidimensionally. No transaction costs are generated in this case, and high scalability results. Given the multidimensionality, at least some exemplary embodiments may realize a short duration during verification. Moreover, exemplary embodiments may almost entirely prevent manipulation and yield high data reliability. Exemplary embodiments may furthermore create an option of micropayments, i.e., the automated payment of microamounts between machines.

Other exemplary embodiments are computer programs for executing one of the methods described herein when the computer program runs on a computer, a processor, or a programmable hardware component. Depending on specific implementation requirements, exemplary embodiments can be implemented in hardware or in software. The implementation may be performed using a digital storage medium such as a floppy disk, DVD, Blu-ray disc, CD, ROM, PROM, EPROM, EEPROM or flash memory, hard disk, or another magnetic or optical memory on which electronically-readable control signals are saved that can interact or do interact with a programmable hardware component so that the respective method is performed.

A programmable hardware component may be formed by a processor, a computer processor (CPU=central processing unit), a graphics processor (GPU=graphics processing unit), a computer, a computer system, an application-specific integrated circuit (ASIC), an integrated circuit (IC), a single chip system (SOC=system-on-a-chip), a programmable logic element or a field-programmable gate array with a microprocessor (FPGA=field-programmable gate array).

The digital storage medium can therefore be machine or computer-readable. Several exemplary embodiments therefore comprise a data carrier that has electronically-readable control signals which are capable of interacting with a programmable computer system or a programmable hardware component such that a method described herein is performed. An exemplary embodiment is accordingly a data carrier (or a digital storage medium or a computer-readable medium) on which the program for performing one of the methods described herein is recorded.

In general, exemplary embodiments may be implemented as a program, firmware, computer program or computer program product with a program code or as data, wherein the program code or the data is, or respectively are effective in performing one of the methods when the program runs on a processor or a programmable hardware component. The program code or the data can for example also be saved on a machine-readable carrier or data carrier. The program code or the data can inter alia exist as source code, machine code or byte code as well as another intermediate code.

The above-described exemplary embodiments merely represent an illustration of the principles of the present invention. Of course, modifications and variations of the arrangements and details described herein are apparent to persons skilled in the art. It is therefore intended that the invention is not restricted by the specific details which were presented herein with reference to the description and the explanation of the exemplary embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

LIST OF REFERENCE SIGNS

10 Method for generating an ID for an equipped status of a vehicle
12 Determination of a first information on one or more available software components and their software versions
14 Determination of a second information on one or more available hardware components and their hardware versions
16 Generation of a hash value based on the first information, the second information and software content of the one or more software components
18 Provision of the hash value as an ID for the equipped status of the vehicle
32 Security system
34 Network with block chain
36 OCU/vehicle
38 Backend
41 Request update job from the backend
42 Provide update job
43 Call network versions
44 Document configuration
45 ORU update available?
46 Start download process
47 Terminate ORU process
48 Start display via HMI download
49 Terminate ORU process
50 Save data as hash
100 Vehicle
200 Backend

What is claimed is:

1. A method for generating an ID for an equipped status of a vehicle, comprising:
determining a first information on one or more available software components and their software versions;
determining a second information on one or more available hardware components and their hardware versions;
generating a hash value based on the first information, the second information and software content of the one or more software components; and
provisioning of the hash value as an ID for the equipped status of the vehicle,
furthermore comprising saving the hash value in a decentralized database,
wherein saving is performed in a multidimensional graph.

2. The method of claim 1, wherein the decentralized database corresponds to a database corresponding to a distributed ledger technology.

3. The method of claim 2, wherein saving is unique, and changes to the saved data are detectable by verifying the hash value.

4. The method of claim 3, wherein the saving comprises distributing identical copies of the ID to a network with several members.

5. The method of claim 3, furthermore comprising verification of the equipped status of the vehicle by verifying the generated ID with an ID provided by the vehicle.

6. The method of claim 2, wherein the saving comprises distributing identical copies of the ID to a network with several members.

7. The method of claim 2, wherein generating the hash value furthermore is based on one or more elements of the group consisting of a vehicle configuration, a point in time of generation, a vehicle parameter, a maximum speed, an activation of an adaptive distance alert, and an activation of a vehicle-related service.

8. The method of claim 2, furthermore comprising verification of the equipped status of the vehicle by verifying the generated ID with an ID provided by the vehicle.

9. The method of claim 1, wherein generating the hash value furthermore is based on one or more elements of the group consisting of a vehicle configuration, a point in time of generation, a vehicle parameter, a maximum speed, an activation of an adaptive distance alert, and an activation of a vehicle-related service.

10. The method of claim 9, wherein saving is unique, and changes to the saved data are detectable by verifying the hash value.

11. The method of claim 9, wherein the saving comprises distributing identical copies of the ID to a network with several members.

12. The method of claim 9, furthermore comprising verification of the equipped status of the vehicle by verifying the generated ID with an ID provided by the vehicle.

13. The method of claim 1, furthermore comprising verification of the equipped status of the vehicle by verifying the generated ID with an ID provided by the vehicle.

14. The method of claim 13, wherein the verification of the equipped status is performed each time the vehicle starts.

15. A non-transitory storage medium with instructions for performing the method of claim 1 when the instructions are executed by a computer, a processor, or programmable hardware component.

16. A device comprising a control circuit that is designed to perform the method of claim 1.

17. A vehicle comprising the device according to claim 16.

18. A system comprising the vehicle according to claim 17.

19. A network component comprising the device according to claim 16.

20. The method of claim 1, wherein the decentralized database corresponds to a block chain.

* * * * *